(12) United States Patent
Mori et al.

(10) Patent No.: US 8,408,633 B2
(45) Date of Patent: Apr. 2, 2013

(54) SEAL STRUCTURE FOR RETRACTABLE ROOF VEHICLE

(75) Inventors: Kousuke Mori, Hiroshima (JP); Hirofumi Ogawa, Hiroshima (JP); Shinya Murakami, Machida (JP)

(73) Assignee: Nishikawa Rubber Co., Ltd., Hiroshima-shi, Hiroshima-ken (JP)

( * ) Notice: Subject to any disclaimer, the term of this patent is extended or adjusted under 35 U.S.C. 154(b) by 0 days.

(21) Appl. No.: 13/298,986

(22) Filed: Nov. 17, 2011

(65) Prior Publication Data

US 2012/0161463 A1 Jun. 28, 2012

(30) Foreign Application Priority Data

Dec. 22, 2010 (JP) ................. 2010-285893

(51) Int. Cl.
*B60J 10/10* (2006.01)
(52) U.S. Cl. ................................. 296/107.04
(58) Field of Classification Search ............. 296/107.04, 296/213

See application file for complete search history.

(56) References Cited

U.S. PATENT DOCUMENTS

| 3,227,485 | A | * | 1/1966 | Geiger | 296/121 |
| 5,100,195 | A | * | 3/1992 | Patel | 296/107.11 |
| 7,380,862 | B2 | * | 6/2008 | Olney et al. | 296/107.04 |

* cited by examiner

*Primary Examiner* — H Gutman
(74) *Attorney, Agent, or Firm* — Robert P. Michal; Lucas & Mercanti, LLP

(57) ABSTRACT

A seal structure comprises: a body side weather strip 10 that includes a die molded part 101 made of a solid material, and makes elastic contact with an under surface of a storage lid 3; a storage lid side weather strip 20 that includes a die molded part 201 that makes elastic contact with the die molded part 101 from above; and a roof side weather strip 30 that includes a die molded part 301 that makes elastic contact with a front upper surface of the storage lid 3 and the die molded part 101 from above. The die molded part 201 further includes a hollow seal part 41 made of a sponge material, which extends downward and makes elastic contact with the die molded part 101.

3 Claims, 4 Drawing Sheets

SEAL STRUCTURE FOR RETRACTABLE ROOF VEHICLE

This application claims the benefit under 35 USC 119 of JP Patent Application JP2010-285893 filed Dec. 22, 2010, the entire discloser of which is incorporated herein by reference.

BACKGROUND OF THE INVENTION

The present invention relates to a seal structure installed to a bottom part of a rear pillar of a retractable roof vehicle, in which a movable roof is folded and stored in a storage.

FIG. 1 shows an outlook appearance of a retractable roof vehicle in which a roof that opens and closes is folded to open an inner-cabin side of a vehicle. The roof is made of a soft top 1. As illustrated by the two-dotted line in the drawing, a storage lid 3 covering a storage area 2 on a lower rear side of the vehicle is opened as it is pushed to the upper rearward standing position, and the roof folded is stored inside the storage 2. The storage area 2 is also used as a trunk room, while there is another type of a storage that is independent from the trunk room. There is a type of roof that is made, instead of the soft top, of a roof panel and a back window panel disposed behind the roof panel, and the roof panel is folded and overlaid on the back window panel and stored in the storage area 2. A type of vehicle having such roof is generally called a retractable hardtop, a coupe cabriolet, or a coupe convertible.

As shown in FIG. 2 (which illustrates a rear part of the retractable roof vehicle in which the soft top 1 is excluded), in the rear part of the retractable roof vehicle, a body side weather strip 10 makes elastic contact with an under surface of the storage lid 3 when the storage lid 3 is closed, thereby sealing between the storage lid 3 and the body of the vehicle. The body side weather strip 10 is installed along a flange (not shown) provided to an edge portion of a body side aperture for the storage lid 3. A storage lid side weather strip 20 is overlaid on a body side weather strip 10 when the storage lid 30 is closed, thereby sealing between the storage lid 3 and the body of the vehicle and preventing an intrusion of water. The storage lid side weather strip 20 is installed to a front left and a front right sides of the storage lid 3 with clips and adhesion tapes (both of which are not shown). (In FIG. 2, a storage lid side weather strip to be installed to a right side of the vehicle is not shown.)

Moreover, a roof side weather strip 30 is installed to a rear frame (not shown) of the soft top 1. When the soft top 1 is spread out, the roof side weather strip 30 makes elastic contact with an upper front surface of the storage lid 3, thereby sealing between the soft top 1 and the storage lid 3 and preventing an intrusion of water.

In this specification, the upward, downward, forward, backward, leftward and rightward directions are determined in relative to the vehicle directed in the forward direction.

The seal structure described above, however, fails to provide a good sealing property. That is, the body side weather strip 10 and the storage lid side weather strip 20 include die molded parts with a shape of a flat fin piece, and the fin piece of the storage lid side weather strip 20 is simply overlaid on the fin piece of the body side weather strip 10 at a bottom part of the rear pillar 4 of the retractable roof vehicle to provide a sealing performance. Accordingly, the seal structure cannot provide a good sealing property.

In order to overcome the above problem, a die molded part 101 of the body side weather strip 10 may include a hollow seal part that makes elastic contact with the storage lid side weather strip 20. However, when the soft top 1 is opened or closed, the roof side weather strip 30 slides on the die molded part 101 of the body side weather strip 10 at a time the roof side weather strip 30 makes elastic contact with the body side weather strip 10, and thus the body side weather strip 10 has to be made with a highly solid material to avoid any damages.

Therefore, if the hollow seal part is included in the die molded part 101 of the body side weather strip 10, the hollow seal part also has to be made with a solid material, which deteriorates flexibility and a sealing function of the weather strips.

It is therefore an object of the present invention to provide a seal structure for a retractable roof vehicle, which is able to prevent water from intruding between a storage lid and a body of a vehicle.

SUMMARY OF THE INVENTION

According to a first aspect of the invention, a seal structure is installed at a bottom part of a rear pillar (4) of a retractable roof vehicle in which a roof (1) that open and close is folded and stored in a storage (2) covered by a storage lid (3).

The seal structure comprising:

a body side weather strip (10) including a die molded part (101) made of a solid material, the body side weather strip (10) installed along an edge portion 501 of a body side aperture for the storage lid (3), and the body side weather strip (10) adapted to make elastic contact with an under surface 502 of the storage lid (3);

a storage lid side weather strip (20) including a die molded part (201), the storage lid side weather strip (20) installed to a front left and a front right sides of the storage lid (3), the die molded part (201) of the storage lid side weather strip (20) adapted to make elastic contact with the die molded part (101) of the body side weather strip (10) from above; and a roof side weather strip (30) including a die molded part (301), the roof side weather strip (30) installed to a circumference edge portion of the roof (1), the die molded part (301) of the roof side weather strip (30) adapted to make elastic contact with a front upper surface 503 of the storage lid (3), the die molded part (301) of the roof side weather strip (30) further adapted to make elastic contact with the die molded part (101) of the body side weather strip (10) from above; wherein the die molded part (201) of the storage lid side weather strip (20) further includes a hollow seal part (41) made of a sponge material, the hollow seal part (41) extends downward and is adapted to make elastic contact with the die molded part (101) of the body side weather strip (10).

In addition, according to a second aspect of the invention, the die molded part (201) of the storage lid side weather strip (20) includes a seal lip part (42) in addition to the hollow seal part (41), and the seal lip part (42) is adapted to make elastic contact with the die molded part (101) of the body side weather strip (10).

In addition, according to a third aspect of the invention, the die molded part (101) of the body side weather strip (10) includes a step form uprising from an outer-cabin side of the vehicle to an inner-cabin side thereof forming an upper step part (18) and a lower step part (19), and the hollow seal part (41) is adapted to make elastic contact with the upper step part (18) while the seal lip part (42) is adapted to make elastic contact with the lower step part (19).

Symbols in parentheses show constituents or items corresponding to Figures and DESCRIPTION OF PREFERRED EMBODIMENT.

According to the first aspect of the seal structure for a retractable roof vehicle, the die molded part of the storage lid side weather strip installed to the front left and front right sides of the storage lid includes the hollow seal part made of a sponge material, and the hollow seal part is adapted to make elastic contract from above with the die molded part of the body side weather strip installed to the edge portion of the body side aperture for the storage lid. The seal structure is placed at a bottom part of the rear pillar of the retractable roof vehicle in which a roof that opens and closes is folded and stored in the storage. Accordingly, the hollow seal part made of a sponge material has an improved followability compared to a hollow seal part made of a solid material, and thus the seal structure provides an improved sealing performance.

As a result, the seal structure provides a good water-tightness and thus prevents an intrusion of water into an inner-cabin side of the vehicle through between the storage lid and the body of the vehicle when, for example, the roof is opened or closed.

Moreover, the die molded part of the body side weather strip, to which the die molded part of the roof side weather strip installed to the circumference edge portion of the roof makes elastic contact from above, is merely made of a solid material whereby the die molded part of the body side weather strip is provided with a high rigidity. Thus, even if the roof side weather strip slides on the body side weather strip when elastic contact is made, the body side weather strip is not damaged.

According to the second aspect of the invention, the die molded part of the storage lid side weather strip includes the seal lip part, in addition to the hollow seal part, which is adapted to make elastic contact with the die molded part of the body side weather strip, by which a double sealing structure is formed. Therefore, the seal structure further prevents an intrusion of water into the inner-cabin side through between the storage lid and the body of the vehicle.

According to the third aspect of the invention, the die molded part of the body side weather strip includes the step form uprising from the outer-cabin side to the inner-cabin side forming the upper step part and the lower step part, so that water at the outer-cabin side has to cross over the step form to intrude, which is not easy. Moreover, the hollow seal part makes elastic contact with the upper step part while the seal lip part makes elastic contact with the lower step part, whereby the water to be intruding to the inner-cabin side is blocked at two sections. Accordingly, the seal structure provides a good sealing performance.

DESCRIPTION OF PREFERRED EMBODIMENT

A seal structure for a retractable roof vehicle according to an embodiment of the present invention will be described below with reference to FIGS. 1 to 7.

Figure 1:
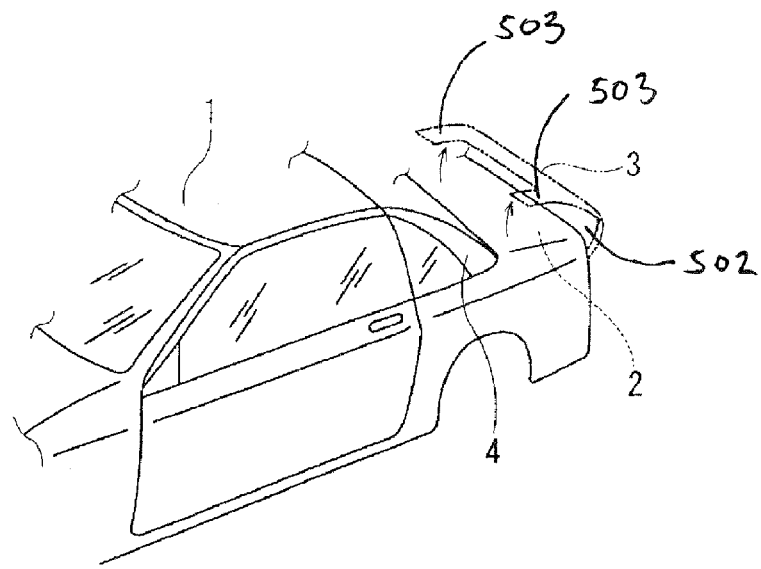
FIG. 1 is a perspective view showing an outlook appearance of a retractable roof vehicle.
Figure 2:
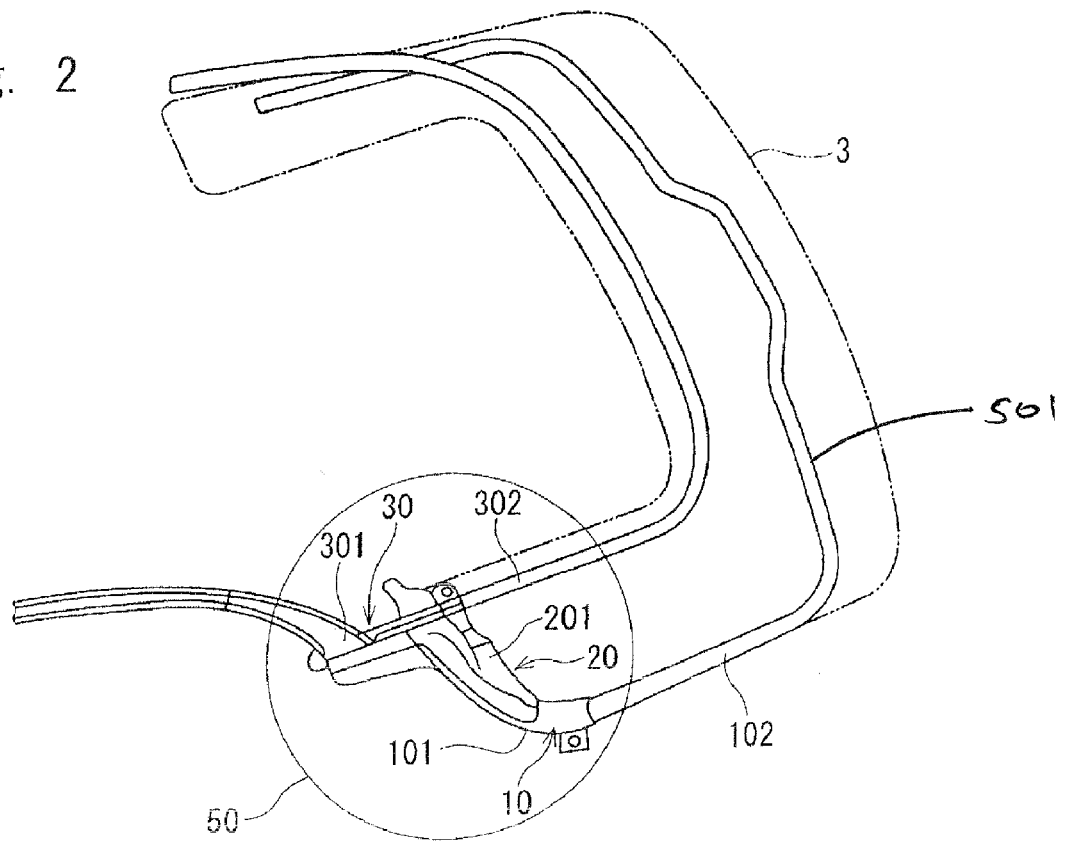
FIG. 2 is a perspective view schematically showing a seal structure provided to a rear part of the retractable roof vehicle.
Figure 3:
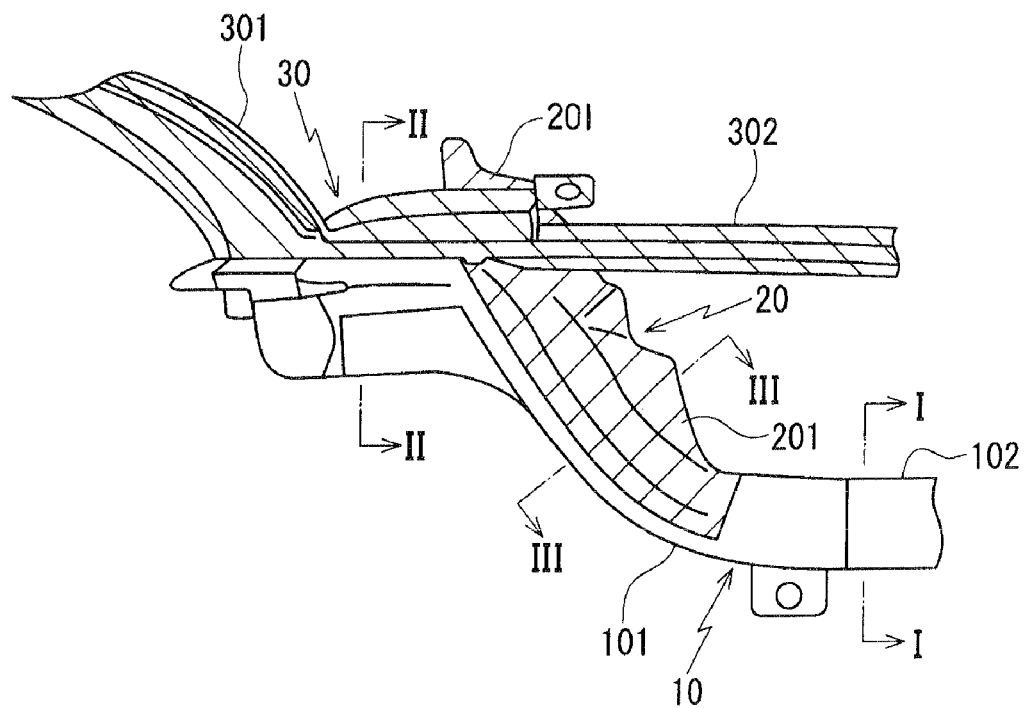
FIG. 3 is an enlarged side elevation view of the "50" section in FIG. 2.

As shown in FIG. 1, the seal structure is installed to a type of vehicle in which a soft top 1 that opens and closes is folded and stored inside a storage 2 at a rear part of a body of a vehicle. As shown in FIGS. 2 and 3 (FIG. 3 is an enlarged side elevation view of the part "50" in FIG. 2), the seal structure is specifically provided to a bottom part of a rear pillar 4 where a die molded part 101 of a body side weather strip 10, a die molded part 201 of a storage lid side weather strip 20, and a die molded part 301 of a roof side weather strip 30 make elastic contact with one another. When the soft top 1 is to be folded and stored in the storage 2, a storage lid 3 covering the storage 2 is opened toward the rear side standing position as illustrated by the two-dotted line in FIG. 1, then the soft top 1 is moved backward, folded and stored inside the storage 2. The storage lid 3 is then returns to the frontward side to close an open space of the storage 2. In FIG. 3, the storage lid side weather strip 20 is illustrated with the oblique lines directed from an upper right side to a lower left side, while the roof side weather strip 30 is illustrated with the oblique lines directed from an upper left side to a lower right side.

Figure 4:
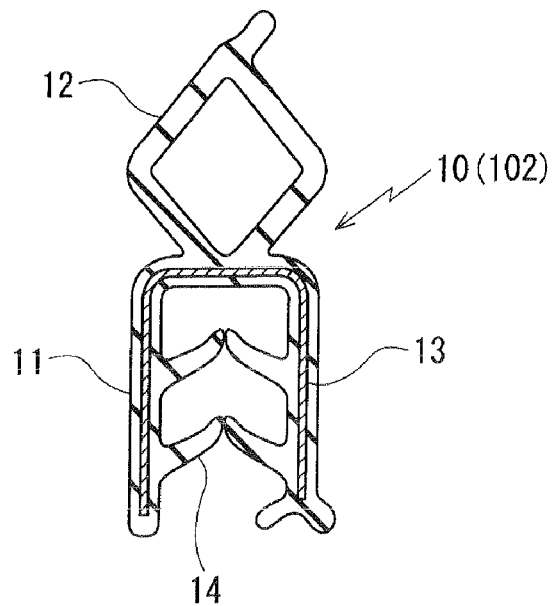
FIG. 4 is an enlarged sectional view along the line I-I in FIG. 3.
Figure 5:
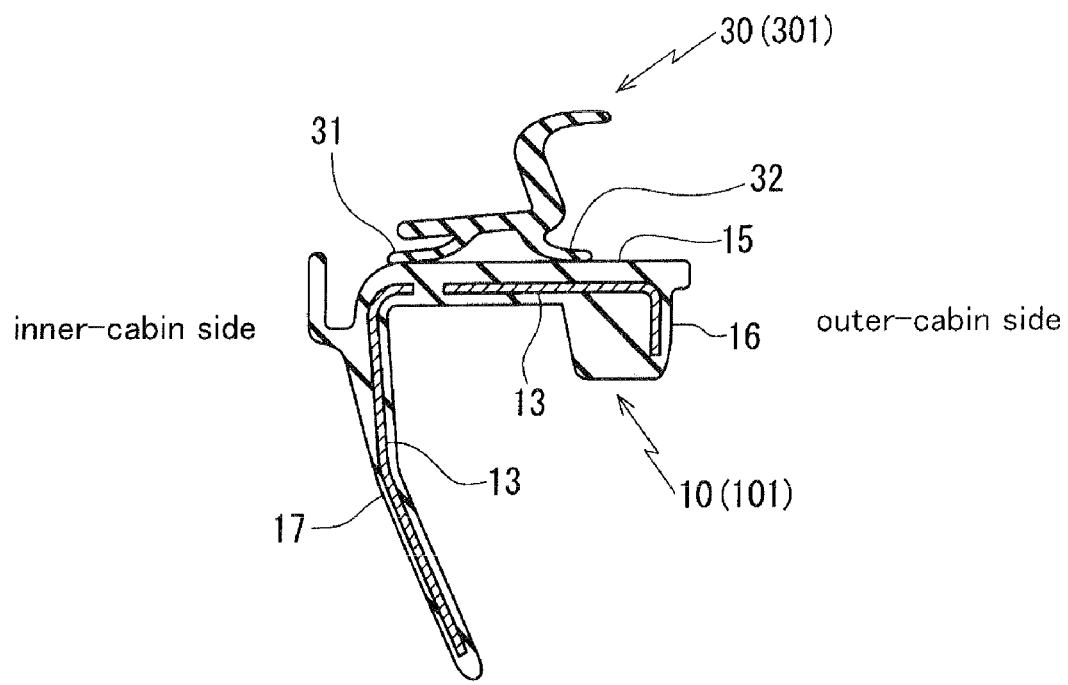
FIG. 5 is an enlarged sectional view along the line II-II in FIG. 3.
Figure 6:
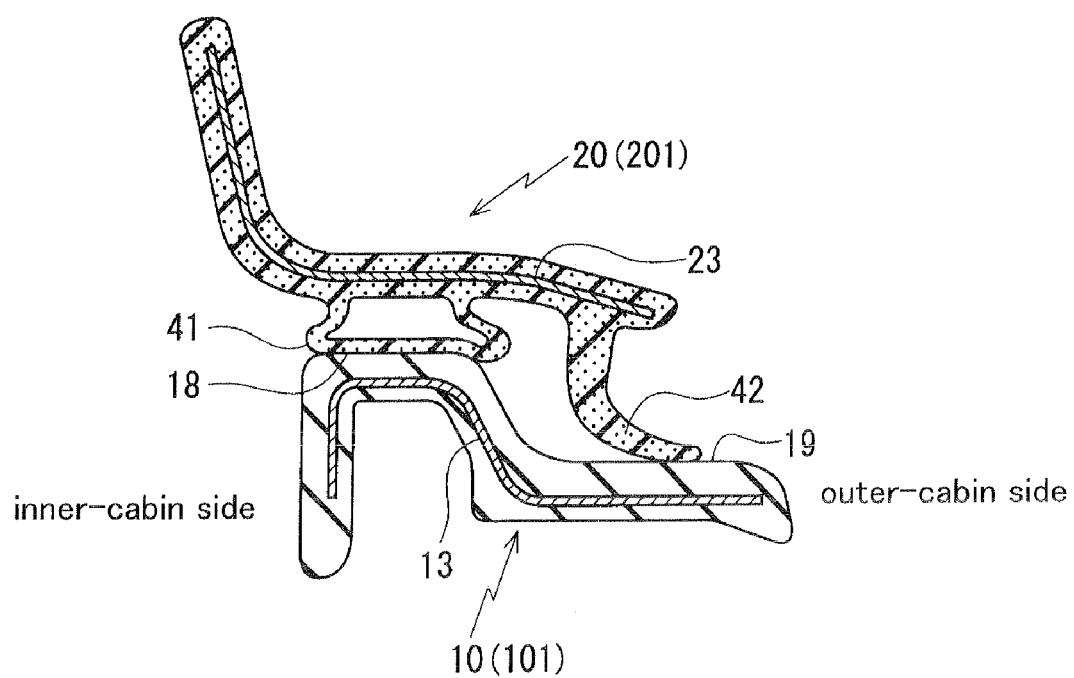
FIG. 6 is an enlarged sectional view along the line III-III in FIG. 3 showing a body side weather strip and a storage lid side weather strip in contact with each other.
Figure 7:
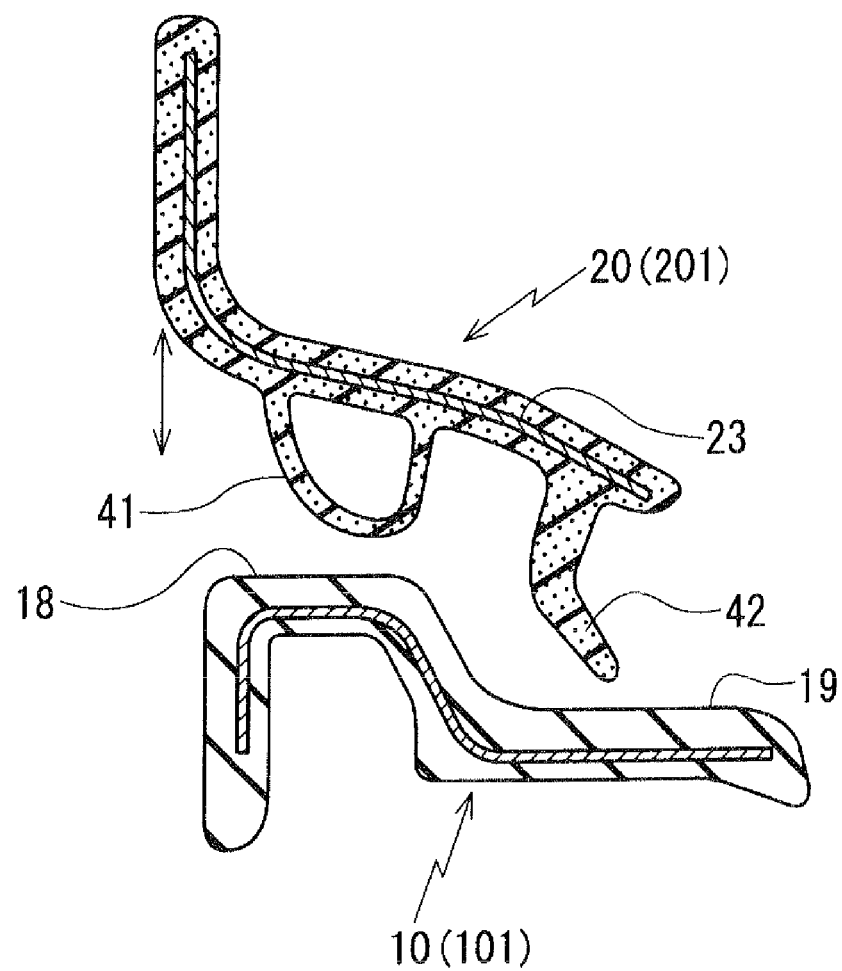
FIG. 7 is an enlarged sectional view along line III-III in FIG. 3, showing the body side weather strip and the storage lid side weather strip prior to contact.

The body side weather strip 10 is installed along an edge portion 501 of a body side aperture to be covered by the storage lid 3. When the storage lid 3 is closed, the body side weather strip 10 makes elastic contact with an under surface 502 of the storage lid 3 to, seal between the storage lid 3 and the body of the vehicle. As shown in FIG. 4 (which is an enlarged sectional view along the line I-I in FIG. 3), the body side weather strip 10 includes an extrusion molded part 102 having an opening to which a flange (not shown) formed along the edge portion of the body side aperture is inserted. The body side weather strip 10 further includes a die molded part 101 connected to the extrusion molded part 102, as shown in FIGS. 5 and 6 (FIG. 5 is an enlarged sectional view along the line II-II in FIG. 3, and FIG. 6 is an enlarged sectional view along the line III-III in FIG. 3.)

The extrusion molded part 102 of the body side weather strip 10 includes an installation base member 11 having a "U" shape in section and directly installed to the flange (not shown). The extrusion molded part 102 further includes a hollow seal part 12 integrally molded with a top part of the installation base member 11 and elastically deforms when making elastic contact with the storage lid 3. A core member 13 is embedded in the installation base member 11, and a plurality (four in this embodiment) of claw parts 14 to be engaged with the flange (not shown) are formed at an inner side of the installation base member 11.

The die molded part 101 of the body side weather strip 10 is wholly formed with a solid material and has a fin piece shape in which the core member 13 is embedded. As shown in FIG. 5, a flat part 15, on which the die molded part 301 of the roof side weather strip 30 makes elastic contact, is formed at a front side of the die molded part 101. The die molded part 101 includes a part 16 extending downward at an outer-cabin side of the vehicle and a part 17 extending downward at an inner-cabin side thereof. The part 17 has a longer length than the part 16, whereby the die molded part 101 forms a substantially reversed "7" shape in section. As shown in FIG. 6, the die molded part 101 has a step form at a region thereof behind the flat part 15. The step form upraises from the outer-cabin side to the inner-cabin side on the substantially center portion of the region of the die molded part 101. The region of the die molded part 101 has a downwardly inclined shape. The step form forms an upper step part 18 and a lower step part 19, both of which are flat and form a substantially dipper shape in section together.

The die molded part 201 of the storage lid side weather strip 20 is installed to a front left and a front right sides of the storage lid 3 with clips and adhesion tapes (which are not shown). As shown in FIG. 6, the die molded part 201 has a substantially "L" shape in section at an area that makes elastic contact with the die molded part 101 of the body side weather strip 10. A core member 23 is embedded in the die molded part 201 to improve the rigidity of the die molded part 201.

The die molded part 201 of the storage lid side weather strip 20 includes a hollow seal part 41 extending downward from a horizontally extending part at the inner-cabin side of the vehicle, and a seal lip part 42 that is provided at the outer-cabin side of the vehicle 42 and has a tip part bending toward the outer-cabin side of the vehicle. The die molded part 201 of the storage lid side weather strip 20 including the hollow seal part 41 and the seal lip part 42 is made of a sponge material. When the storage lid 3 in an open posture (FIG. 7) is rotated in the frontward direction to be closed (FIG. 6), the hollow seal part 41 formed in the die molded part 201 of the storage lid side weather strip 20 makes elastic contact with the upper step part 18 formed in an uprising step form in the die molded part 101 of the body side weather strip 10, while the seal lip part 42 makes elastic contact with the lower step part 19 also formed in an uprising step form in the die molded part 101 thereof.

The roof side weather strip 30 is installed to a rear frame (not shown) attached to a circumference edge portion of the soft top 1. When the soft top 1 is spread out, the roof side weather strip 30 makes elastic contact with an upper front surface 503 of the storage lid 3 in a closed position, and seals between the soft top 1 and the storage lid 3 thereby preventing an intrusion of water. The roof side weather strip 30 includes an extrusion molded part 302 having a substantially "U" shape in plane view and extending along the storage lid 3, and a die molded part 301 connected to an end part of the extrusion molded part 302.

The die molded part 301 of the roof side weather strip 30 is located above the die molded part 101 of the body side weather strip 10 and the die molded part 201 of the storage lid side weather strip 20 in a substantially perpendicular form. As shown in FIG. 5, the die molded part 301 includes two lip parts 31, 32 extending downward. The lip parts 31, 32 make elastic contact with an upper surface of a flat part 15 formed in the die molded part 101 of the body side weather strip 10, spreading in the leftward and rightward directions, respectively, at a position in front of the area where the die molded part 201 of the storage lid side weather strip 20 makes elastic contact with the die molded part 101 of the body side weather strip 10.

According to the seal structure for a retractable roof vehicle of the embodiment of the invention, the die molded part 201 of the storage lid side weather strip 20 installed to the front left and front right sides of the storage lid 3 includes the hollow seal part 41 and the seal lip part 42 both of which are made of a sponge material. The hollow seal part 41 and the seal lip part 42 are adapted to make elastic contact with the upper surface of the die molded part 101 of the body side weather strip 10 installed along the edge portion of the body side aperture for the storage lid 3. Therefore, the seal structure forms a double sealing structure with a good water-tightness by which water is prevented from intruding into the inner-cabin side of the vehicle through between the storage lid 3 and the body of the vehicle when, for example, the soft top 1 is opened or closed.

Moreover, the die molded part 101 of the body side weather strip 10 includes the step form uprising from the outer-cabin side of the vehicle to the inner-cabin side thereof, so that the seal structure further prevents an intrusion of water into the inner-cabin side of the vehicle, since the water at the outer-cabin side has to cross over the step form in order to intrude to the inner-cabin side of the vehicle.

Further, the die molded part 101 of the body side weather strip 10, on which the die molded part 301 of the roof side weather strip 30 installed to the circumference edge portion of the soft top 1 makes elastic contact, is made of a solid material, by which the die molded part 101 is provided with a high rigidity. Thus, even if the roof side weather strip 30 slides on the body side weather strip 10 at a time the roof side weather strip 30 makes elastic contact with the body side weather strip 10 when the soft top 1 is opened or closed, the body side weather strip 10 is not damaged.

In this embodiment, the die molded part 201 of the storage lid side weather strip 20 includes the hollow seal part 41 and the seal lip part 42 which are made of a sponge material and are adapted to make elastic contact with the die molded part 101 of the body side weather strip 10. The seal structure is able to provide a good sealing performance even if the die molded part 201 includes only the hollow seal part 41, excluding the seal lip part 42. Moreover, the seal structure may exclude the step form from the die molded part 101 of the body side weather strip 10.

Further, the die molded part 201 of the storage lid side weather strip 20 including the hollow seal part 41 and the seal lip part 42 is wholly made of a sponge material. Instead of such configuration, merely the hollow seal part 41 and the seal lip part 42 may be made of the sponge material.

The retractable roof vehicle, to which the seal structure of the invention is installed, includes not only the hood type but also a type in which a roof is configured with a roof panel and a back window panel disposed behind the roof panel, and the roof panel folded is overlaid on the back window panel and stored in the storage 2 together, or even another type having a removal roof.

We claim:

1. A seal structure installed at a bottom part of a rear pillar of a retractable roof vehicle in which a roof that opens and closes is folded and stored in a storage area covered by a storage lid, the seal structure comprising:
    a body side weather strip including a die molded part made of a solid material, the body side weather strip installed along an edge portion of a body side aperture for the storage lid, and the body side weather strip adapted to make elastic contact with an under surface of the storage lid;
    a storage lid side weather strip including a die molded part, the storage lid side weather strip installed to a front left and a front right sides of the storage lid, the die molded part of the storage lid side weather strip adapted to make elastic contact with the die molded part of the body side weather strip; and
    a roof side weather strip including a die molded part, the roof side weather strip installed to a circumference edge portion of the roof, the die molded part of the roof side weather strip adapted to make elastic contact with a front upper surface of the storage lid, the die molded part of the roof side weather strip further adapted to make elastic contact with the die molded part of the body side weather strip; wherein
    the die molded part of the storage lid side weather strip further includes a hollow seal part made of a sponge material, the hollow seal part extends downward and is adapted to make elastic contact with the die molded part of the body side weather strip.

2. The seal structure as claimed in claim 1, wherein the die molded part of the storage lid side weather strip includes a seal lip part in addition to the hollow seal part, the seal lip part is adapted to make elastic contact with the die molded part of the body side weather strip.

3. The seal structure as claimed in claim 2, wherein the die molded part of the body side weather strip includes a step form uprising from an outer-cabin side of the vehicle to an inner-cabin side thereof forming an upper step part and a lower step part, the hollow seal part is adapted to make elastic contact with the upper step part while the seal lip part is adapted to make elastic contact with the lower step part.

* * * * *